United States Patent
Goldman

(10) Patent No.: US 10,306,022 B2
(45) Date of Patent: May 28, 2019

(54) FACILITATING THE OPERATION OF A CLIENT/SERVER APPLICATION WHILE A CLIENT IS OFFLINE OR ONLINE

(71) Applicant: Adobe Inc., San Jose, CA (US)

(72) Inventor: Oliver I. Goldman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/299,311

(22) Filed: Oct. 20, 2016

(65) Prior Publication Data
US 2017/0041439 A1    Feb. 9, 2017

Related U.S. Application Data

(63) Continuation of application No. 11/283,123, filed on Nov. 18, 2005, now Pat. No. 9,497,292.

(51) Int. Cl.
*G06F 16/00* (2019.01)
*G06F 16/10* (2019.01)
(Continued)

(52) U.S. Cl.
CPC .............. *H04L 67/42* (2013.01); *H04L 67/02* (2013.01); *H04L 67/1095* (2013.01); *H04L 67/327* (2013.01)

(58) Field of Classification Search
CPC ......... G06F 17/30575; G06F 17/30174; G06F 17/30861; G06F 17/30581; G06F 17/30876; G06F 17/30879; G06F 21/305; G06F 17/30377; G06F 17/30578; G06F 17/30902; G06F 3/0484; G06F 17/30371; G06F 9/542; G06F 11/1471; G06F 11/2038; G06F 11/2048; G06F 11/2064; G06F 11/2074; G06F 11/2094; G06F 11/2097; G06F 17/30002; G06F 17/30194; G06F 17/30244; G06F 17/30289; G06F 17/303; G06F 17/30374; G06F 17/30495; G06F 8/60; G06F 17/30896; G06F 2201/80; G06F 3/1423
(Continued)

(56) References Cited

U.S. PATENT DOCUMENTS 5,329,619 A    7/1994 Page et al.
5,418,835 A    5/1995 Frohman et al.
(Continued)

OTHER PUBLICATIONS

"Advisory Action", U.S. Appl. No. 11/283,123, dated Jun. 23, 2008, 3 Pages.
(Continued)

*Primary Examiner* — Yicun Wu
(74) *Attorney, Agent, or Firm* — SBMC

(57) ABSTRACT

One embodiment of the present invention provides a system that facilitates the operation of a client/server application while a client is online or offline. The system operates by receiving a request from an application at a client to synchronize data with a server. In response to the request, the system places the data in a resource, wherein the resource can be a file. Next, the system sends an acknowledgement to the application. The system then determines a protocol for synchronizing the resource with the server. Finally, the system queues the resource for synchronization with the server, or optionally synchronizes the resource with the server immediately.

20 Claims, 2 Drawing Sheets

(51) Int. Cl.
*H04L 29/06* (2006.01)
*H04L 29/08* (2006.01)

(58) Field of Classification Search
IPC .............................................. G06F 17/30,17/00
See application file for complete search history.

(56) References Cited

U.S. PATENT DOCUMENTS

| | | | |
|---|---|---|---|
| 5,694,454 | A | 12/1997 | Hill et al. |
| 5,742,668 | A | 4/1998 | Pepe et al. |
| 5,781,857 | A | 7/1998 | Hwang et al. |
| 5,790,789 | A | 8/1998 | Suarez |
| 5,991,771 | A | 11/1999 | Falls et al. |
| 6,363,411 | B1 | 3/2002 | Dugan et al. |
| 6,438,594 | B1 | 8/2002 | Bowman-Amuah |
| 6,560,655 | B1 | 5/2003 | Grambihler et al. |
| 6,988,199 | B2 | 1/2006 | Toh et al. |
| 9,497,292 | B2 | 11/2016 | Goldman |
| 2002/0194251 | A1 | 12/2002 | Richter |
| 2003/0023657 | A1* | 1/2003 | Fischer ............... G06F 8/60 718/102 |
| 2003/0233404 | A1 | 12/2003 | Hopkins |
| 2004/0040025 | A1 | 2/2004 | Lehtinen |
| 2004/0064570 | A1 | 4/2004 | Tock |
| 2004/0139235 | A1 | 7/2004 | Rashid et al. |
| 2004/0255048 | A1 | 12/2004 | Lev Ran et al. |
| 2006/0271681 | A1 | 11/2006 | Apreutesei et al. |
| 2007/0014314 | A1* | 1/2007 | O'Neil ............... H04L 67/104 370/503 |
| 2013/0124601 | A1 | 5/2013 | Goldman |

OTHER PUBLICATIONS

"Advisory Action", U.S. Appl. No. 11/283,123, dated Oct. 21, 2009, 3 Pages.
"BPAI Decision", U.S. Appl. No. 11/283,123, filed Mar. 20, 2013, 6 pages.
"Examiners Answers to Appeal Brief", U.S. Appl. No. 11/283,123, dated Apr. 2, 2010, 20 Pages.
"Final Office Action", U.S. Appl. No. 11/283,123, dated Mar. 24, 2008, 15 Pages.
"Final Office Action", U.S. Appl. No. 11/283,123, dated Aug. 7, 2009, 17 Pages.
"Non Final Office Action", U.S. Appl. No. 11/283,123, dated Jan. 26, 2009, 15 Pages.
"Non Final Office Action", U.S. Appl. No. 11/283,123, dated Sep. 18, 2007, 11 Pages.
"Non-Final Office Action", U.S. Appl. No. 11/283,123, dated Feb. 12, 2016, 12 pages.
"Non-Final Office Action", U.S. Appl. No. 11/283,123, dated Aug. 6, 2015, 13 pages.
"Notice of Allowance", U.S. Appl. No. 11/283,123, dated Jul. 13, 2016, 9 pages.
"Notice of Panel Decision from Pre-Appeal Brief Review", U.S. Appl. No. 11/283,123, dated Jul. 22, 2008, 2 pages.
Ramesh,"A Multi-Layer Client-Server Queueing Network Model with Synchronous and Asynchronous Messages", Center for Advanced Computing and Communication, North Carolina State University., Nov. 2000, 13 Pages.

* cited by examiner

FACILITATING THE OPERATION OF A CLIENT/SERVER APPLICATION WHILE A CLIENT IS OFFLINE OR ONLINE

This Application claims priority under 35 U.S.C. Section 120 as a continuation of U.S. patent application Ser. No. 11/283,123, filed Nov. 18, 2005, and titled "Facilitating the operation of a client/server application while a client is offline or online," the entire disclosure of which is hereby incorporated by reference.

BACKGROUND

Field of the Invention

The present invention relates to client/server applications. More specifically, the present invention relates to a method and an apparatus for facilitating the operation of a client/server application regardless of whether a client is online or offline.

Related Art

The increased computing power of mobile computing devices, and the recent boom in the handheld computing device market have led to a substantial increase in the number of client/server applications. Fueled by the abundance of Wi-Fi "hotspots" and high-bandwidth wireless communication services, users are routinely working "on the road." However, even with the increasing coverage of wireless communication services, there are many locations where users are unable to connect to corporate networks or to the Internet. In addition, there are many locations, such as on most airplanes, where Internet connectivity is not an option.

In order to maximize productivity, users typically work offline when they are not able to connect to online resources. Unfortunately, most client/server applications do not handle offline work gracefully, if at all. In addition, when the users are finally able to go online, it can be difficult to synchronize their offline work with the corresponding online resources.

Furthermore, programmers are having an increasingly difficult time coding applications that cross the online/offline boundary. For example, due to the abundance of tools for programming web-based applications, along with their relative ease of use, a large number of client/server applications are web-based applications that are accessed via a web browser. These browser applications typically do not have facilities for allowing a user to work offline. As a result, in many instances, programmers completely abandon offline support.

Hence, what is needed is a method and an apparatus that enables a user to work seamlessly whether or not the user's computing device is online or offline.

SUMMARY

One embodiment of the present invention provides a system that facilitates the operation of a client/server application while a client is online or offline. The system operates by receiving a request from an application at a client to synchronize data with a server. In response to the request, the system places the data in a resource, wherein the resource can be a file. Next, the system sends an acknowledgement to the application. The system then determines a protocol for synchronizing the resource with the server. Finally, the system queues the resource for synchronization with the server, or optionally synchronizes the resource with the server immediately.

If the client is online, the system can synchronize the resource with the server according to various rules and conditions, such as synchronization priority and network utilization. If the client is offline, the system leaves the resources in the queue until the client subsequently goes online, and has an active connection to the server, at which point synchronization can take place.

One embodiment of the present invention enables the application to operate in exactly the same way if the client is online or offline. In this embodiment, the application operates solely on a resource, and does not have to be aware of whether the client is online or offline. The framework provided by embodiments of the present invention handles the synchronization of the resource for the application. This greatly simplifies programming of the application.

In a variation on this embodiment, upon receiving the acknowledgement, the application continues processing without having to worry about performing subsequent synchronization operations.

In a variation of this embodiment, determining the synchronization protocol additionally involves determining a synchronization priority for the resource, wherein the synchronization priority is used to prioritize the synchronization of resources in the queue.

In a variation of this embodiment, the resource includes an identifier for an authority that controls the content of the resource, a synchronization protocol for the resource, a synchronization status of the resource, and a last-synchronization time of the resource.

In a further variation, the synchronization protocol is the Hyper-Text Transfer Protocol (HTTP).

In a further variation, the synchronization protocol includes a schedule for synchronization. In this variation, the resource will be synchronized only if it satisfies the schedule.

In a further variation, the system notifies the user of the synchronization status of the resource when the synchronization status of the resource changes.

In a variation of this embodiment, the system is implemented as an operating-system service.

In a variation of this embodiment, the resource is an eXtensible Markup Language (XML) file.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Computer Network

Figure 1:
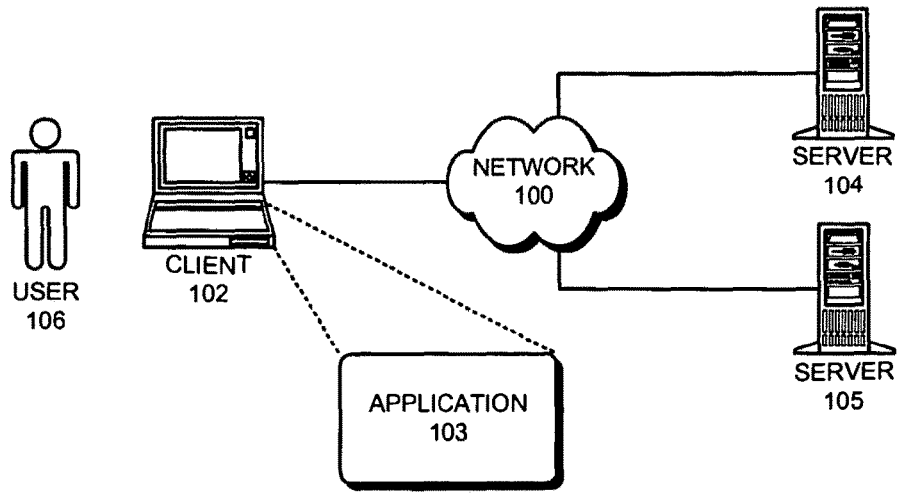
FIG. 1 illustrates a computer network in accordance with an embodiment of the present invention.

FIG. 1 illustrates a computer network 100 in accordance with an embodiment of the present invention. Network 100 can generally include any type of wired or wireless communication channel capable of coupling together computing nodes. This includes, but is not limited to, a local area network, a wide area network, or a combination of networks. In one embodiment of the present invention, network 100 includes the Internet.

Client 102 is coupled to network 100. Client 102 can generally include any node on a network including computational capability and including a mechanism for communicating across the network 100.

Servers 104 and 105 are also coupled to network 100. Servers 104 and 105 can generally include any computational node including a mechanism for servicing requests from a client 102 for computational and/or data storage resources.

Client 102 includes application 103. User 106 interacts directly with client 102. Client 102 in turn interacts with servers 104 and 105 via network 100.

The term "online" refers to a state in which client 102 has an active connection to network 100, or any other network that enables client 102 to communicate with servers 104 and 105. Conversely, the term "offline" refers to a state where client 102 does not have an active connection to network 100, or any other network that enables client 102 to communicate with servers 104 and 105.

For example, client 102 may be a laptop which is presently located in a remote part of the world where client 102 has no available network connection, and thus cannot communicate with servers 104 and 105. In that state, client 102 is "offline." In contrast, when client 102 is moved to a home office where client 102 has a Virtual Private Network (VPN) connection to network 100 via a cable modem, and can consequently communicate with servers 104 and 105, client 102 is "online."

Resource Management Facility

Figure 2:
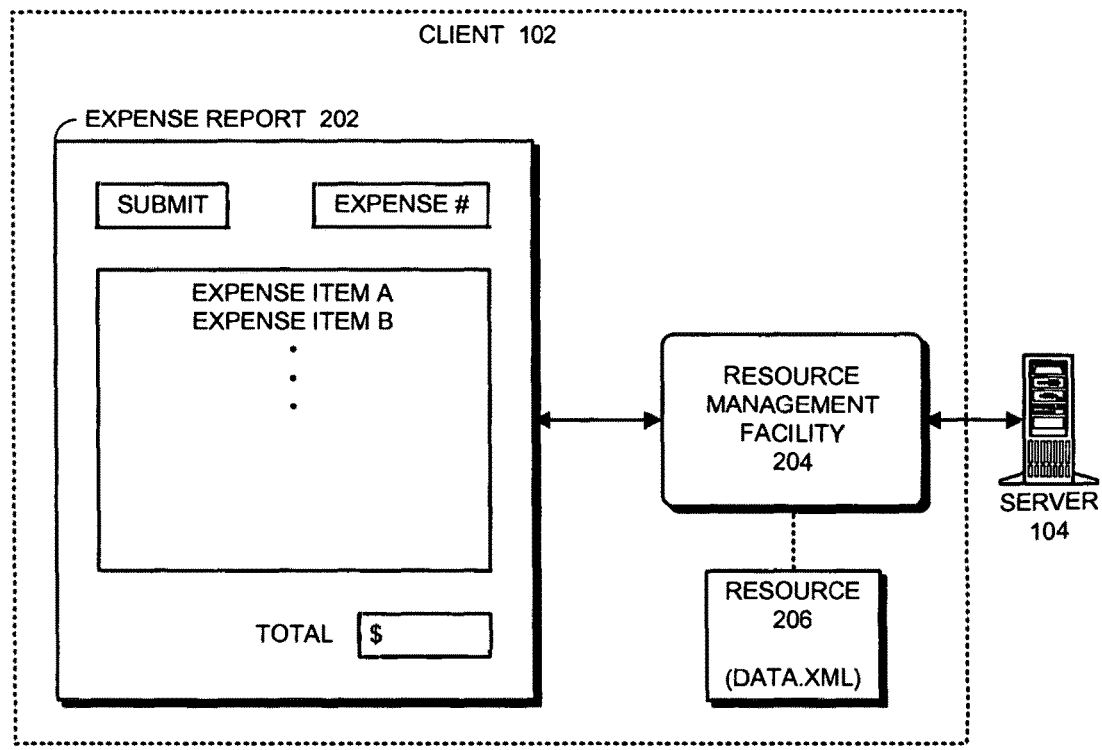
FIG. 2 illustrates the use of a Resource Management Facility (RMF) in accordance with an embodiment of the present invention.

FIG. 2 illustrates the use of a Resource Management Facility (RMF) 204 in accordance with an embodiment of the present invention. In one embodiment of the present invention, RMF 204 exists within client 102. In one embodiment of the present invention, RMF 204 is implemented as an operating-system service. Note that the term "operating-system service" refers to a program that executes on a computer system and provides various functionality to other programs executing on the computer system.

One embodiment of the present invention provides a framework that has two distinct elements: (1) resources, and (2) mechanisms for updating resources. During operation, user 106 notifies the framework about the resources that user 106 cares about, and the framework is responsible for keeping those resources up-to-date.

For example, consider the case where user 106 submits an expense report 202 while user 106 is working on an airplane where there is no connectivity between client 102 and network 100. When user 106 clicks on the "SUBMIT" button after filling out expense report 202, the application 103 causes the data from expense report 202 to be placed in resource 206, which in one embodiment of the present invention is a data.xml file. (Note that XML, or eXtensible Markup Language, is a platform-independent structured data format that includes data, as well as descriptors for the data.)

After the data is placed in the resource, RMF 204 identifies resource 206 as an updatable resource and identifies the protocol for submitting the data in resource 206 to server 104 (e.g., via an HTTP POST operation. An HTTP POST operation is defined within the HyperText Transfer Protocol, which is used to request that a server accept data enclosed in the request sent to the server.) Next, when client 102 goes back online, the data from resource 206 will be submitted to server 104 without further involvement of user 106.

Resource Management Facility 204 acts as a monitor for all of the updateable resources. In addition, RMF 204 maintains a current copy of update rules for each resource. When client 102 goes back online, RMF 204 scans the list of resources and determines which ones are not up-to-date and then updates them.

Continuing with the expense report example, when client 102 goes online, RMF 204 submits the data from expense report 202 via HTTP POST to server 104. Server 104 can optionally return data back to client 102, e.g., server 104 may send the expense report number to client 102, which client 102 uses to populate the expense report number field after the submission of expense report 202 is completed. When user 106 subsequently opens expense report 202, the field with the expense number is populated with data from server 104.

In one embodiment of the present invention, RMF 204 can be thought of as a global outbox which runs in the background on client 102. RMF 204 identifies the number of resources that are not up-to-date when client 102 is offline, and identifies the status of each resource being synchronized while client 102 is online. Note, that this can include displaying a status bar showing the synchronization progress for each resource, or for a collection of resources. Updates may take place based on priority or some type of scheduling system so that all resources are not updated at the same time.

In another embodiment of the present invention, RMF 204 acts as a data synchronizer between client 102 and server 104. In addition to queuing resources to submit to server 104 while client 102 is offline, RMF 204 also maintains a list of resources to be synchronized with server 104 when client 102 goes back online.

For example, in one embodiment of the present invention, the present invention may be used to update news stories without having to open a web browser to fetch the stories (e.g., the New York Times' Technology section), where each story is a separate resource that is updated via HTTP GET from a web server. Note that an HTTP GET method retrieves, via the HyperText Transfer Protocol, a resource identified in a GET request. RMF 204 also may be used to get the latest version of documents (e.g., expense reports themselves could be an updateable resource). Virtually any data that is sent from client 102 to server 104, or vice versa, can be maintained and kept up-to-date by RMF 204.

In another example embodiment of the present invention, user 106 subscribes to various news feeds via a Really Simple Syndication (RSS) news reader. Note that RSS is a family of XML file formats for Web syndication used by news websites and weblogs. In this embodiment, user 106 subscribes to multiple news sources. For instance, user 106 might subscribe to a political news feed from CNN.com and an Opinion-Editorial news feed from the Wall Street Journal. In this embodiment, requests are created by the RSS news reader application 103 and sent to RMF 204. RMF 204 places these requests into resources within RMF 204. According to the subscription rules for each of these resources, RMF 204 contacts a server designated in each resource to retrieve available news stories. As news stories are retrieved from their respective servers, they are placed into resources, and passed off to the RSS news reader application 103 on client 102. For example, RMF 204 queries server 104 for the latest political news from CNN.com. If new stories exist from a previous update, RMF 204 requests the RSS version of those stories. Upon receiving the RSS version of those stories, RMF 204 places those stories into resources and passes the stories back to the RSS news reader. In addition, RMF 204 queries server 105 for the latest Opinion-Editorial news stories from the Wall Street Journal. Server 105 responds to RMF 204 indicating that no new stories exist, but a newer version of an existing story that RMF 204 has previously received exists. RMF 204 requests the newer version of the existing story from server 105, and overwrites the existing resource in RMF 204. RMF 204 also sends the newer version of the news story to the RSS news reader.

In one embodiment of the present invention, developers can write applications where the model network activity is performed declaratively. This has to do with how RMF 204 knows which resources need to be updated and how to update them. In contrast, in a typical application, a programmer needs to include code for various network related operations, such as checking for an active network connection. This information is implicit in code which the application programmer needs to write. For example:
// Get a new copy of fubar
Resource fubar=http.connect("http://example.com");

This statement is procedural, not declarative. In one embodiment of the present invention, this information is declared by the application author. For example:

```
<resource>
    <name>fubar</name>
    <url>http://example.com</url>
    <update>hourly</update>
</resource>
```

In this embodiment, because the model network activity is performed declaratively and not procedurally, client 102 can execute the same code when client 102 is online as client 102 executes when client 102 is offline.

As stated previously, the application 103 will identify the resource as an updatable resource, and will also identify the method of submitting the data in the resource to server 104. Note that the declaration does not need to be in a markup language as shown here; it could be made in a number of different ways. The important thing is that the author is declaring this information in some form, and that RMF 204 executes it at the appropriate time, as opposed to the author writing the code and explicitly executing the update.

One embodiment of the present invention proposes an RMF 204 model including three features: (1) every resource is a file which is kept up-to-date; (2) a resource is kept up-to-date with respect to an authority; and (3) resources are updated via an update protocol. Resources become known to RMF 204 via a declaration, Application Programming Interface (API) invocation, or other mechanisms. To RMF 204, each resource is an opaque blob of data with several pieces of associated metadata: the authority; the update protocol; the resource's status; and the resource's last update time.

In one embodiment of the present invention, RMF 204 runs continually. For example, RMF 204 might be implemented as an operating system service. In one embodiment of the present invention, RMF 204 is implemented as a Microsoft Windows™ service. This service maintains what is effectively a database, each record of which enumerates a resource along with some associated metadata. When running, RMF 204 accesses this database to continually determine which resources need to be updated. There are two cases for updating:

A new resource: When a resource is first declared to RMF 204, it is typically not up-to-date. RMF 204 will schedule an update for this resource. The set of pending updates are stored in a queue. Management of this queue is described below.

An existing resource: Update protocols specify when a resource transitions from "up-to-date" status to "out-of-date". For example, a resource might need to be updated periodically, perhaps every ten minutes. RMF uses the current time, status, last update time, and protocol of a resource to determine whether or not it is up-to-date. If it is out-of-date, an update is scheduled.

In one embodiment of the present invention, an RMF (not illustrated in FIG. 2) is implemented on server 104. This server-side RMF queues resources from server 104 to be synchronized with client 102.

Updates

In one embodiment of the present invention, RMF 204 synchronizes resources between client 102 and servers 104 and 105 by updating local copies of resources on client 102 with data retrieved from servers 104 and 105 (such as in the case of retrieving news stories, web pages, documents, etc.), as well as sending modified resources to servers 104 and 105 (such as in the case of submitting expense reports, filing documents, etc.) While "synchronization" describes the overall process of ensuring that client 102 and servers 104 and 105 have up-to-date versions of each resource, "update" describes the modification of local copies of resources within RMF 204 on client 102.

In one embodiment of the present invention, RMF 204 continually monitors network connectivity and the queue of pending updates. Whenever client 102 is online, RMF 204 processes updates from the queue. A prioritization method may be used to determine which updates to execute first. The priority may be based on the protocol, time of last update, importance, or other factors. RMF 204 may also execute multiple updates at the same time if system resources and network bandwidth permit it. Typically, RMF 204 will generally not execute all updates at once because this would typically overwhelm the system.

In one embodiment of the present invention, updating a resource involves running code associated with its update protocol. For example, updating a resource could involve retrieving a new copy of a document or report, or changing a subscription for an RSS news feed. This may cause the local copy of the resource to be updated. It also updates the status and last update time of the resource. If an update fails, RMF 204 reschedules the update for some future time.

In one embodiment of the present invention, client 102 makes use of RMF 204 by registering resources with RMF 204 and then continuing to use those resources. Client 102 and RMF 204 might "share" the resource in memory, e.g., if the resource is an in-memory XML Document Object Model (DOM), or they may be more loosely associated, e.g., a resource is a file registered by the path of that file. Client 102 can register for notifications about resources. When registered, RMF 204 invokes a client callback when the resource is modified.

In one embodiment of the present invention, RMF 204 monitors registered resources, and doesn't require active client involvement. RMF 204 either registers for appropriate notifications, periodically queries for updates, or the like. For example, consider a web page that updates frequently, such as the CNN.com home page. The resource is the page; the authority is the web server at "http://cnn.com", and the update protocol is HTTP. A browser which uses RMF 204 would create a (local) resource called the "CNN home page" and register it with RMF 204. The resource is initially out-of-date, so RMF 204 would schedule an update. When the update runs, it would perform an HTTP GET on "http://cnn.com" and place the retrieved page in the registered resource. From this point on the browser can display this resource, which is local, regardless of whether client 102 is online or offline.

Note that the "authority" for a resource can include any server that is responsible for controlling the content of the resource. For example, the authority for a resource containing data from Fox News could be "foxnews.com", and the authority for a corporate expense account could be the accounting server of user 106's employer. Also note that the update protocol can include, but is not limited to, HTTP, File Transfer Protocol (FTP), Simple Mail Transfer Protocol (SMTP), Simple Network Management Protocol (SNMP), Network News Transport Protocol (NNTP), Post Office Protocol (POP), Internet Message Access Protocol (IMAP), etc.

The HTTP protocol defines when a fetched resource expires. RMF 204 records the value of this expiration for the CNN page in the resource database. When the resource expires, RMF 204 schedules a new update. This occurs even if the browser is not running. The next time the browser launches, even if it is offline, it has the latest possible copy of the web page available. However, the browser itself does not need to know about online vs. offline behavior, nor does it need to implement HTTP to fetch the resource.

Note that the present invention differs from existing messaging systems in that it provides a framework for client/server applications to operate independent of network status. Resources can be synchronized in real-time, or placed in a queue for synchronization. In contrast, messaging systems place all of the messages into the queue. When a messaging system goes online, it typically tries to synchronize everything in the queue as quickly as possible. One embodiment of the present invention provides for a system that synchronizes items in the queue, only if certain criteria are met. These criteria can include scheduling priority, scheduling windows, bandwidth utilization, client utilization, expiration values, etc.

Also note that embodiments of the present invention differ from the prior art in regards to "offline browsing." For example, in a traditional offline browsing scenario, user 106 is presented with the last known copy of a web page from the last time user 106 visited that web page when client 102 was online. For example, with traditional offline browsing, if user 106 has not visited a web page such as Newsweek.com in two weeks, when user 106 brings up cached versions of Newsweek.com while offline browsing, user 106 will be presented with information that is two weeks old. In contrast, with an embodiment of the present invention, if user 106 has not visited Newsweek.com in two weeks, but was online a few hours before bringing up an offline copy of Newsweek.com, User 106 would be presented with information that was current as of the last time client 102 was online.

One embodiment of the present invention provides a facility for notifying user 106 of the status of resources being monitored by RMF 204. Notification can include the playing of sounds, displaying of pop-up windows or modal dialogs, or the presence of status indicator icons in an area visible to user 106. In this embodiment, RMF 204 could potentially notify user 106 of network status, synchronization status of various resources, availability of new or updated resources, and error conditions that may occur.

For example, in one embodiment of the present invention, if user 106 is reading a news article from Forbes.com, and RMF 204 detects that a newer version of that article exists on server 104, then RMF 204 may retrieve the newer version of the Forbes.com news article and immediately display the Forbes.com news article in a viewer, replacing the old version of the Forbes.com news article that user 106 was viewing. In addition, RMF 204 may play a sound indicating that the Forbes.com news article has been updated, as well as provide user 106 with a modal dialog indicating that the Forbes.com news article has been updated.

Synchronizing Data with the RMF

Figure 3:
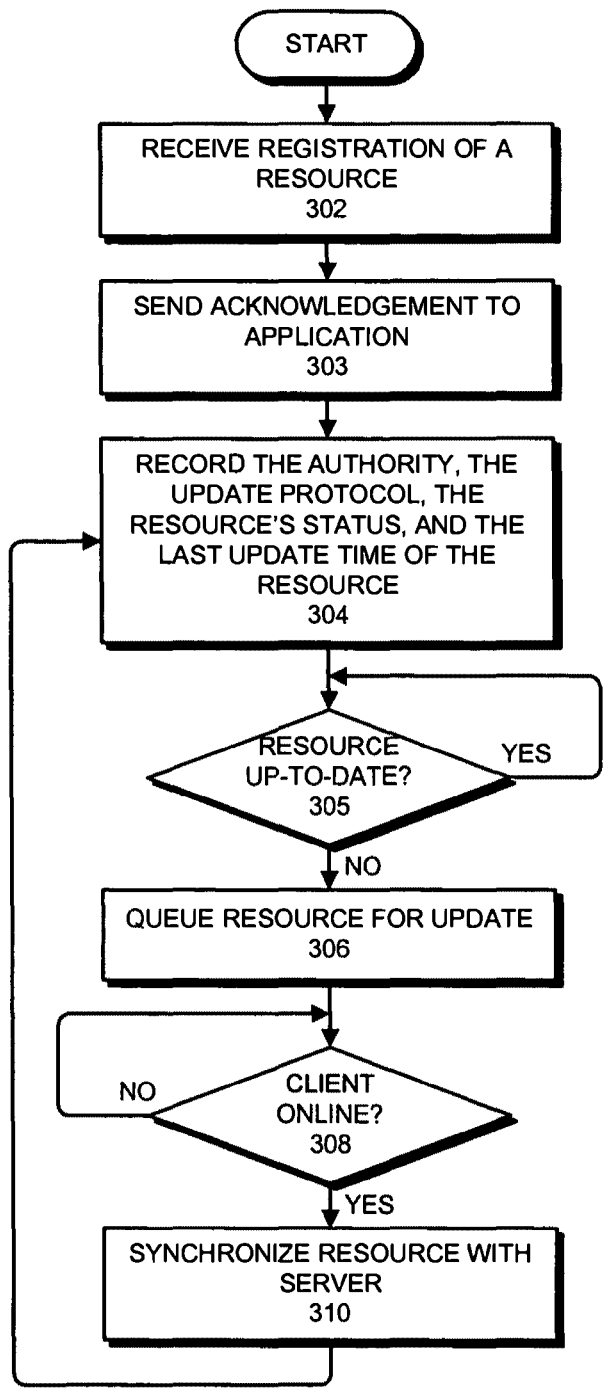
FIG. 3 presents a flowchart illustrating the process of synchronizing data with the RMF in accordance with an embodiment of the present invention.

FIG. 3 presents a flowchart illustrating the process of synchronizing data with RMF 204 in accordance with an embodiment of the present invention. The system starts by receiving a registration of a resource (step 302). Next, the system sends an acknowledgement to the application 103 (step 303). Note that by sending an acknowledgement to the application 103, the application 103 can continue processing without performing subsequent synchronization operations. Next, the system records the authority, the update protocol, the resource's status, and the last update time of the resource (step 304). Next, the system determines if the resource is up-to-date (step 305). If so, the system keeps checking if the resource has changed locally, or if an expiration time specified in the update protocol has been reached. If the resource has changed locally, or the expiration time has been reached, the system can determine that an update is needed. At this point, the system schedules the resource for an update (step 306).

In one embodiment of the present invention, scheduling the resource for an update involves placing the resource in a queue. The system then determines if the client is online (step 308). If the client is offline, the resource remains in the queue while the client periodically checks connectivity to the server. When the client goes online, the system synchronizes the resource with the server (step 310), and returns to step 304 to record the authority, the update protocol, the resource's status, and the last update time of the resource, since they all have potentially changed with the update. Note that in one embodiment of the present invention, the system runs continually to ensure that all updateable resources are kept as up-to-date as possible while the client is online, and to queue updates for resources while the client is offline.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
receiving, by a computing device, a request from an application running on the computing device to synchronize data on the computing device with a server while the computing device is offline;
while the computing device is offline and in response to the request:
placing, by the computing device, the data in a resource implemented in hardware of the computing device, the resource including information describing a last-synchronization time of the resource indicating a time of an update to the resource;
sending, by the computing device, an acknowledgement to the application that enables the application to continue processing before performing the requested synchronization operation with the server; and
queuing, by the computing device, the resource in a queue on the computing device for synchronization with the server, the resource being ordered in the queue based on the last-synchronization time of the resource; and
synchronizing, by the computing device, the resource in the queue with the server in response to the computing device establishing a connection with the server.

2. The method of claim 1, wherein the computing device is configured to perform said receiving, said placing, said sending, and said queuing for at least one other application running on the computing device.

3. The method of claim 1, further comprising determining, by the computing device, a synchronization protocol for synchronizing the resource on the computing device with the server.

4. The method of claim 3, wherein the synchronization protocol includes a schedule for synchronization and synchronizing the resource in the queue is performed when the resource satisfies the schedule for synchronization.

5. The method of claim 3, wherein the synchronization protocol is the Hyper-Text Transfer Protocol (HTTP).

6. The method of claim 1, further comprising determining, by the computing device, a synchronization priority for the resource that is useable to prioritize the synchronization of resources in the queue.

7. The method of claim 1, further comprising providing, by the computing device, an indication of a synchronization status of the resource to a user of the computing device, the indication of the synchronization status comprising one of an audible sound, a displayed pop-up window, or a status indicator icon displayed in a user interface of the computing device.

8. The method of claim 1, wherein the resource further includes at least one of:
an identifier for an authority that controls content of the resource;
an identifier for a synchronization protocol for the resource; and
a synchronization status of the resource.

9. In a digital medium environment for data synchronization, a system comprising:
a resource management facility implemented by a computing device, the resource management facility comprising:
a receiving mechanism configured to receive a request from an application running on the computing device to synchronize data on the computing device with a server while the computing device is offline;
a resource mechanism configured to place the data in a resource that is implemented in hardware of the computing device and that indicates a last-synchronization time of an update to the resource;
an acknowledgement mechanism configured to send an acknowledgement to the application running on the computing device to continue processing before performing a subsequent synchronization operation;
a queuing mechanism configured to queue the resource in a queue on the computing device for synchronization with the server until the computing device establishes a connection with the server; and
a synchronization mechanism configured to synchronize the resource in the queue with the server in response to the computing device establishing a connection with the server.

10. The system of claim 9, wherein the receiving mechanism is configured to receive another request from at least one other application running on the computing device to synchronize other data on the computing device with the server while the computing device is offline.

11. The system of claim 10, wherein the resource mechanism is configured to place the other data in another resource on the computing device that indicates a last-synchronization time of an update to the other resource.

12. The system of claim 10, wherein the acknowledgement mechanism is configured to send another acknowledgement to the other application running on the computing device to continue processing before performing a subsequent synchronization operation.

13. The system of claim 10, wherein the queuing mechanism is configured to queue the other resource in the queue on the computing device for synchronization with the server until the computing device establishes a connection with the server.

14. The system of claim 10, wherein the synchronization mechanism is configured to synchronize the other resource in the queue with the server in response to the computing device establishing a connection with the server.

15. The system of claim 9, the resource management facility further comprising a determination mechanism configured to determine a synchronization protocol for synchronizing the resource on the computing device with the server, the synchronization protocol including a schedule for synchronization, wherein the synchronization mechanism synchronizes the resource only if the resource satisfies the schedule for synchronization.

16. In a digital medium environment to synchronize data with a server, a system comprising:
a receiving mechanism for receiving a request from an application to synchronize data with a server while the system is offline;
a resource mechanism for placing the data in a resource implemented in hardware of the system, the resource including information specifying a last-synchronization time of the resource indicating a time of an update to the resource;
an acknowledgement mechanism for sending an acknowledgement to the application that enables the application to continue processing before performing a subsequent synchronization operation;
a queuing mechanism for queuing the resource in a queue for synchronization with the server until the system establishes a connection with the server; and
a synchronization mechanism for synchronizing the resource in the queue with the server in response to the system establishing a connection with the server.

17. The system of claim 16, wherein the resource further includes at least one of:
   an identifier for an authority that controls content of the resource;
   an identifier for a synchronization protocol for the resource; and
   a synchronization status of the resource.

18. The system of claim 16, wherein the synchronization mechanism is configured to provide an indication of a synchronization status of the resource to a user of the system, the indication of the synchronization status comprising one of an audible sound, a displayed pop-up window, or a status indicator icon displayed in a user interface of the system.

19. The system of claim 16, wherein the synchronization mechanism is configured to determine a synchronization priority for the resource that is useable to prioritize the synchronization of resources in the queue.

20. The system of claim 16, wherein the system is configured to perform said receiving, said placing, said sending, and said queuing for at least one other application running on the computing device.

\* \* \* \* \*